(12) United States Patent
Lee et al.

(10) Patent No.: US 8,814,049 B2
(45) Date of Patent: Aug. 26, 2014

(54) MOBILE TERMINAL HAVING INFORMATION RECOGNITION MODULE

(75) Inventors: Jang Won Lee, Seoul (KR); Woong Ki Min, Seoul (KR)

(73) Assignee: Bluebird Soft Co., Ltd. (KR)

( * ) Notice: Subject to any disclaimer, the term of this patent is extended or adjusted under 35 U.S.C. 154(b) by 191 days.

(21) Appl. No.: 13/378,510

(22) PCT Filed: Jun. 17, 2010

(86) PCT No.: PCT/KR2010/003916
§ 371 (c)(1), (2), (4) Date: Dec. 15, 2011

(87) PCT Pub. No.: WO2010/147408
PCT Pub. Date: Dec. 23, 2010

(65) Prior Publication Data
US 2012/0088547 A1    Apr. 12, 2012

(30) Foreign Application Priority Data

Jun. 18, 2009   (KR) .................. 10-2009-0054418
Jun. 17, 2010   (KR) .................. 10-2010-0057465

(51) Int. Cl.
*G06K 7/10* (2006.01)
*H04M 1/23* (2006.01)
*H04M 1/2755* (2006.01)
*H04M 1/725* (2006.01)

(52) U.S. Cl.
CPC ....... *G06K 7/10881* (2013.01); *H04M 2250/04* (2013.01); *H04M 1/23* (2013.01); *H04M 1/2755* (2013.01); *H04M 1/7253* (2013.01)
USPC ............. 235/462.3; 235/462.45; 235/462.48; 235/462.43

(58) Field of Classification Search
USPC ................ 235/462.3, 462.43, 462.45, 462.48
See application file for complete search history.

(56) References Cited

U.S. PATENT DOCUMENTS 5,059,778 A     10/1991  Zouzoulas et al.
5,616,906 A *    4/1997  Kumar ..................... 235/472.01
(Continued)

FOREIGN PATENT DOCUMENTS

CN          1732669        2/2006
KR        1988-7001925    11/1988
(Continued)

OTHER PUBLICATIONS

European Search Report—European Application No. 10789735.7 issued on Apr. 29, 2013, citing US 2006267730, US 2003234291 and US 2005001035.

(Continued)

*Primary Examiner* — Michael G Lee
*Assistant Examiner* — Tabitha Chedekel
(74) *Attorney, Agent, or Firm* — Cantor Colburn LLP

(57) ABSTRACT

The present invention relates to a mobile terminal having an information recognition module. The mobile terminal having an information recognition module of the present invention comprises: a terminal casing with a front casing and a rear casing coupled with each other; an information recognition module coupled to the terminal casing; and an information recognition module drive unit, which has a trigger provided at the terminal casing in such a manner that the trigger is exposed outside of the terminal casing, and an operation switch, which generates an electrical signal for operating the information recognition module by a trigger pull motion. According to the present invention, procedures for operating the information recognition module can be improved in convenience and stability.

23 Claims, 11 Drawing Sheets

(56) References Cited

U.S. PATENT DOCUMENTS

| | | | |
|---|---|---|---|
| 5,917,175 A | * | 6/1999 | Miller et al. .............. 235/472.01 |
| 7,165,724 B2 | | 1/2007 | Shimoda et al. |
| 2003/0234291 A1 | | 12/2003 | Wulff et al. |
| 2004/0245341 A1 | * | 12/2004 | Shimoda et al. ......... 235/462.46 |
| 2005/0001035 A1 | | 1/2005 | Hawley et al. |
| 2006/0105722 A1 | * | 5/2006 | Kumar ......................... 455/90.3 |
| 2006/0267730 A1 | | 11/2006 | Steinke et al. |
| 2008/0116280 A1 | * | 5/2008 | Plesko et al. ............. 235/462.48 |
| 2010/0065642 A1 | | 3/2010 | An |

FOREIGN PATENT DOCUMENTS

| | | |
|---|---|---|
| KR | 10-0599930 | 7/2006 |
| KR | 10-2008-0056327 | 6/2008 |

OTHER PUBLICATIONS

International Search Report—PCT/KR2010/003916 dated Feb. 28, 2011.

* cited by examiner

MOBILE TERMINAL HAVING INFORMATION RECOGNITION MODULE

TECHNICAL FIELD

The present invention relates to a mobile terminal, and more particularly to a mobile terminal having an information recognition module.

BACKGROUND ART

In general, a mobile terminal is a terminal capable of transmitting and receiving audio or video data, etc. while moving without regard to places. As a representative mobile terminal, there is a cellular phone or the like mobile communication terminal, a personal digital assistant (PDA), etc. That is, the term 'mobile terminal' involves the PDA, the cellular phone, etc., but the following descriptions will be limited to the PDA for the convenience of explanation.

The PDA is also called a pocket computer, which is a generic term for palm-sized small devices having calculation, information storage and searching functions for personal or business use. Occasionally, it has been mostly used in maintaining information about a schedule calendar, an address book, etc.

In particular, an industrial PDA has currently been mainly used in the distribution industry, but its market has been gradually spread. The industrial PDA refers to a PDA having various office functions, such as a barcode reader for reading a barcode printed on goods or the like, a credit card machine for charging to a credit card or the like, etc.

If the industrial PDA is used, it is advantageous to efficiently progress delivery, data management, related business, etc. For example, an insurance broker of an insurance company can directly process various insurance-related tasks such as customer information management, customer searching, scheduling, a daily record of consultation, memorial day searching, funds statement processing, etc. on the spot through the PDA; a medical worker of a hospital can input or search X-ray image and graphic data as well as medical records and history of a patient, and a prescription through the industrial PDA without being constrained by time and places; and a traffic or patrol cop of the police can perform a crackdown outside of the office through the industrial PDA so that a fine levied for violation of the traffic regulations, the payment of which is currently possible after a lapse of 2 or 3 days from the crackdown, can be directly paid to banking facilities, and it is thus possible for the traffic or patrol cop to remarkably reduce a time taken in the crackdown outside of the office.

Meanwhile, the barcode reader is a device capable of optically reading a barcode coded by combining bars different in thickness from one another, which emits light to the barcode printed on the goods or the like and reads information of the barcode on the basis of an electronic signal generated in accordance with intensity of reflected light. It is a common site that the barcode reader reads the barcode printed on goods and makes selling data when a customer buys goods in a supermarket or the like store. The barcode has been widely used from production management of goods up to selling management since it is correct in light of data input and easy to use. In particular, the barcode is judged to start a revolution in distribution industry.

Such a barcode reader may be provided as one module (hereinafter, referred to as a 'barcode reader module') in the industrial PDA. A conventional industrial PDA having the barcode reader module is configured to receive an operation signal for operating the barcode reader module through one of various button keys on a keypad placed in a certain region of a front casing of the industrial PDA.

However, the conventional industrial PDA having the barcode reader module has a problem of inconvenient operation, pointed out by a user, because s/he has to grasp the industrial PDA with his/her hand, find a button key for operating the barcode reader module on the keypad where a plurality of button keys are densely combined, and press it with a thumb of the hand grasping the industrial PDA or an index finger or the like of the other hand when reading the barcode printed on the goods or the like.

Also, a radio frequency identification (RFID) reader module using a local area frequency as well as the barcode reader module has recently been well-used, and research and development have been progressed for effectively applying the RFID reader module to the current mobile terminal.

Accordingly, in developing the industrial PDA having an information recognition module such as the barcode reader module or the RFID reader module, there is a need of fully considering the convenience and stability for operating the information recognition module.

DISCLOSURE OF INVENTION

Technical Problem

The present inventive concept provides a mobile terminal having an information recognition module, which can be improved in convenience and stability for operating the information recognition module.

Advantageous Effects

According to the present inventive concept, an information recognition module can be operated by pulling a trigger exposed outside of a rear casing, that is, the information recognition module can be operated as the trigger is pulled with an index finger or the like in the state that a user more stably grasps a mobile terminal in his/her hand, thereby improving convenience and stability in operating the information recognition module provided in the mobile terminal.

BEST MODE FOR CARRYING OUT THE INVENTION

Figure 1:
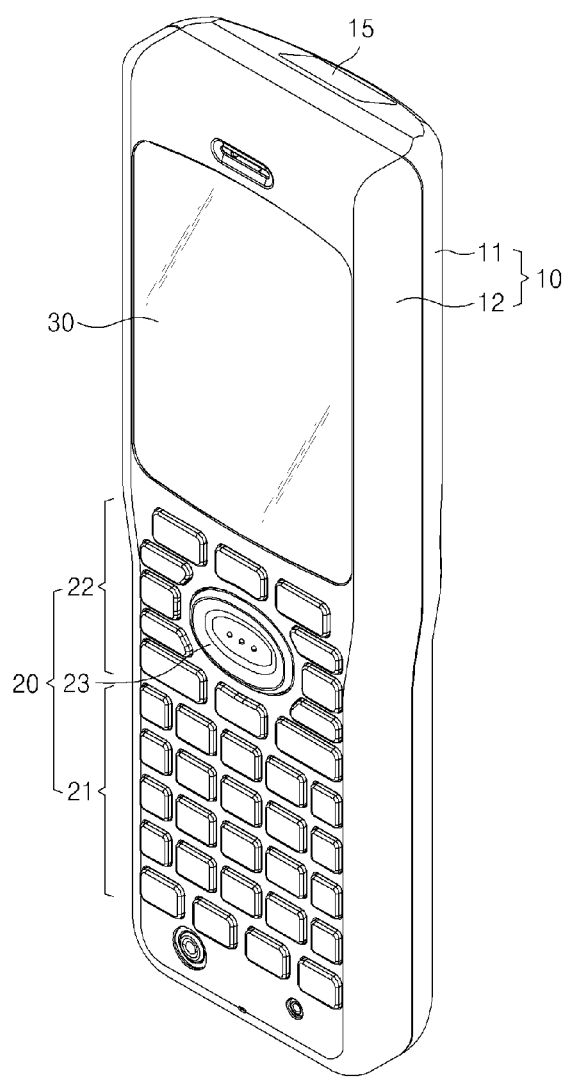
FIG. 1 is a front perspective view of a mobile terminal according to an exemplary embodiment of the present inventive concept.

According to an aspect of the present inventive concept, there is provided a mobile terminal comprising a terminal casing comprising a front casing and a rear casing coupled to each other; an information recognition module coupled to the terminal casing; and an information recognition module drive unit comprising a trigger provided in and exposed outside of the terminal casing, and an operation switch to generate an electrical signal for operating the information recognition module as the trigger is pulled.

The information recognition module may comprise a barcode reader module coupled to the terminal casing, and the information recognition module drive unit comprises a barcode reader module drive unit.

The trigger may be exposed to an outside through the rear casing, and the barcode reader module drive unit may comprise a trigger cover coupled to the rear casing to cover the trigger within the terminal casing; and a sealing member made of a soft material and placed between the trigger cover and the trigger.

The trigger may comprise a pulling unit exposed to the outside through the rear casing so as to be pulled by a user's finger; a rotary unit rotatably coupled to the rear casing; and a switch pressing unit protruding from the pulling unit so as to press the operation switch.

The sealing member may be accommodated in and supported by the trigger cover so that the trigger can be elastically biased in a direction opposed to a direction of pulling the trigger when the trigger is pulled.

The sealing member may be shaped to cover an inner side of the trigger cover and surround the switch pressing unit as being spaced apart from the inner side of the trigger cover at a position corresponding to the switch pressing unit so that the trigger can be elastically biased in a direction opposed to a direction of pulling the trigger when the trigger is pulled.

The sealing member may comprise a first part covering the inner side of the trigger cover; a second part surrounding an end part of the switch pressing unit of the trigger; a third part recessed along a circumference of the second part; and a fourth part bent from the first part and extended toward the third part.

The third part may be thicker than the other parts.

The sealing member may comprise a groove line in which a projection line formed on the inner side of the rear casing is inserted, in a part being in close contact with the inner side of the rear casing.

The sealing member may comprise a main body part covering the inner side of the trigger cover; a contact part being in contact with and pressed by the operation switch as the trigger is pulled; and an inclined part connecting the main body part and the contact part so that the contact part can be elastically biased in a direction opposed to a direction of pressing the contact part when the contact part is pressed.

The trigger may comprise a pulling unit exposed to the outside through the rear casing so as to be pulled by a user's finger; a rotary unit rotatably coupled to the rear casing; and a switch pressing unit being in contact with and coupled with the contact part of the sealing member.

The operation switch may comprise a contact switch coupled to a lower side of the contact part; and a trigger printed circuit board (PCB) formed with a point contact circuit with which the contact switch becomes in contact when the trigger is pulled.

The rear casing may be formed with an opening through which the trigger is exposed to an outside, and a part of the rear casing adjacent to the opening is recessed.

The mobile terminal may further comprise an information recognition speaker which is provided inside the terminal casing and generates a signaling sound when the information recognition module operates, wherein the rear casing comprises a guide partition wall surrounding a circumference of the information recognition speaker on the inner side thereof.

The mobile terminal may further comprise a window placed in an upper part of the rear casing and transmitting light emitted from the barcode reader module, wherein a part of the rear casing adjacent to the window is shaped like an inclined plane.

The mobile terminal may further comprise a main printed circuit board (PCB) provided inside the terminal casing, wherein the barcode reader module and the operation switch are mounted to the main PCB.

The sealing member may comprise silicon rubber; the trigger cover may comprise a synthetic resin; and the operation switch may comprise a tact switch.

The mobile terminal may further comprise a keypad unit provided in one area of the front casing; and a display unit provided adjacent to the keypad unit on the front casing.

The keypad unit may comprise a plurality of letter and numeral keys; a plurality of function keys; and a navigation key.

The display unit may comprise a touch panel.

The information recognition module may comprise a radio frequency identification (RFID) reader module coupled to the terminal casing; and the information recognition module drive unit may comprise an RFID reader module drive unit.

The mobile terminal may further comprise a main printed circuit board (PCB) provided inside the terminal casing, wherein the RFID reader module comprises an RFID reader antenna to receive external information from an RFID tag; an RFID casing coupled to the terminal casing and coupling with the RFID reader antenna; and a bridge PCB arranged between the RFID reader antenna and the main PCB and electrically connecting the RFID reader antenna and the main PCB.

The information recognition module may comprise a barcode reader module coupled to the terminal casing; and an RFID reader module coupled to the terminal casing.

MODE FOR INVENTION

The attached drawings for illustrating preferred embodiments of the present invention are referred to in order to gain a sufficient understanding of the present invention, the merits thereof, and the objectives accomplished by the implementation of the present inventive concept.

Hereinafter, the present inventive concept will be described in detail by explaining preferred embodiments of the invention with reference to the attached drawings. However, descriptions about publicly known functions or configurations will be omitted for clarity.

Figure 2:
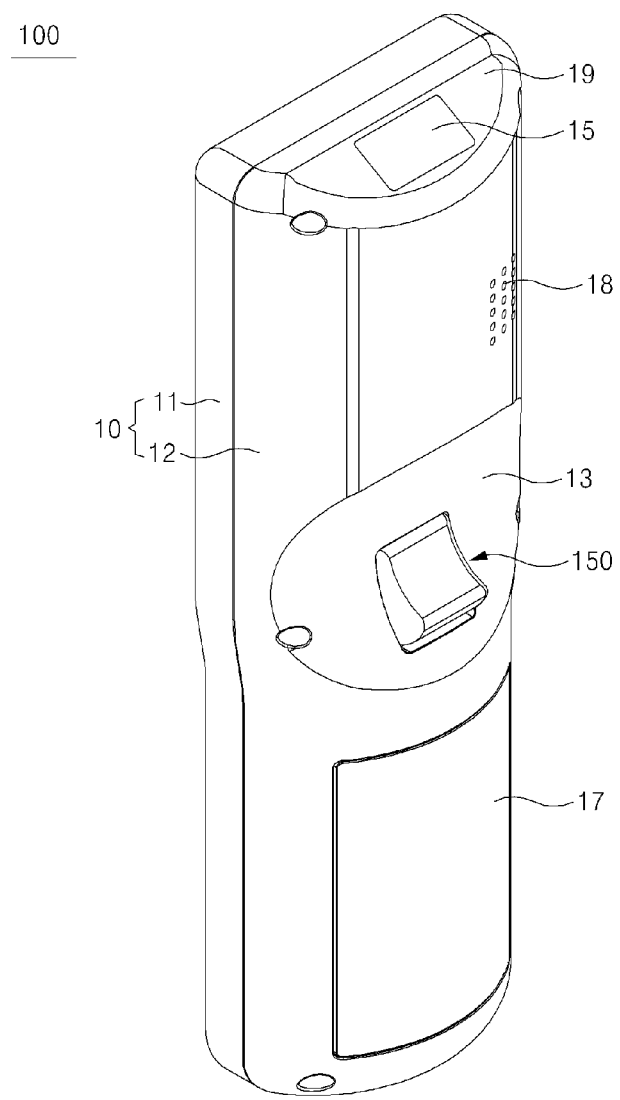
FIG. 2 is a rear perspective view of the mobile terminal of FIG. 1.
Figure 3:
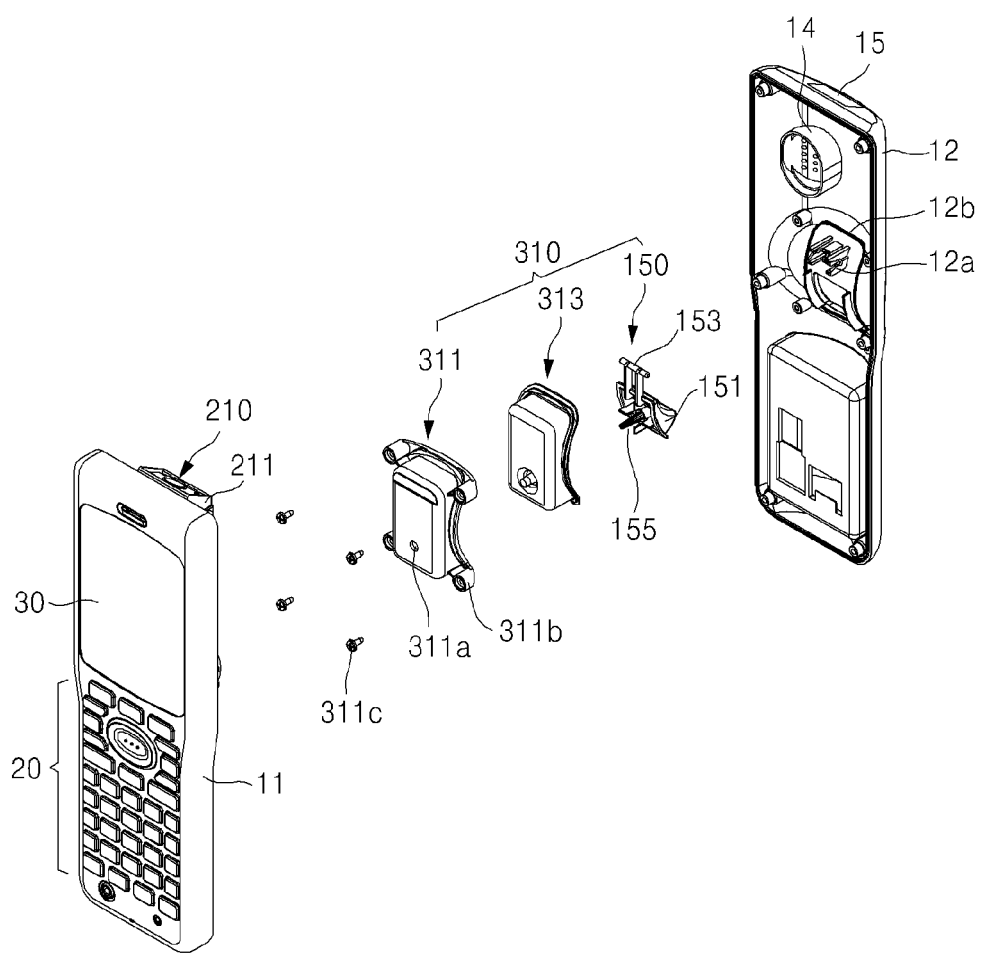
FIG. 3 is a front exploded perspective view of the mobile terminal of FIG. 1.
Figure 4:
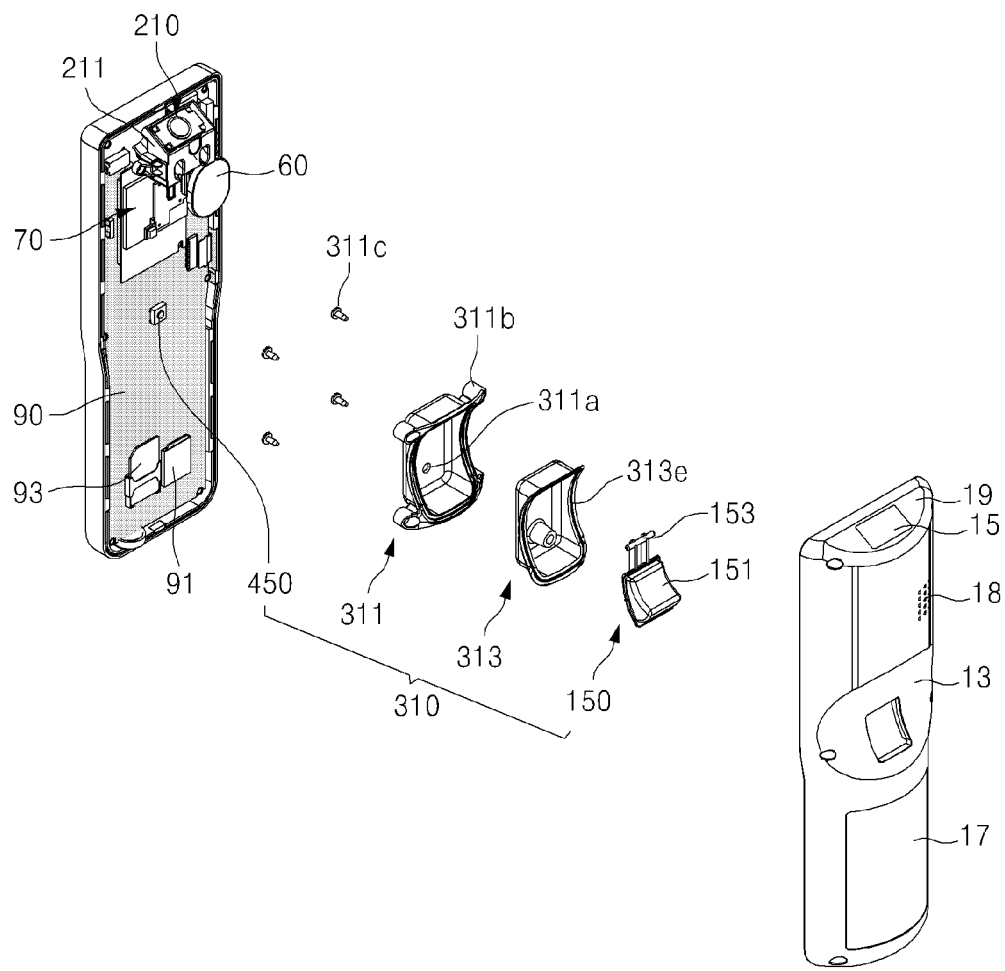
FIG. 4 is a rear exploded perspective view of the mobile terminal of FIG. 1.
Figure 5:
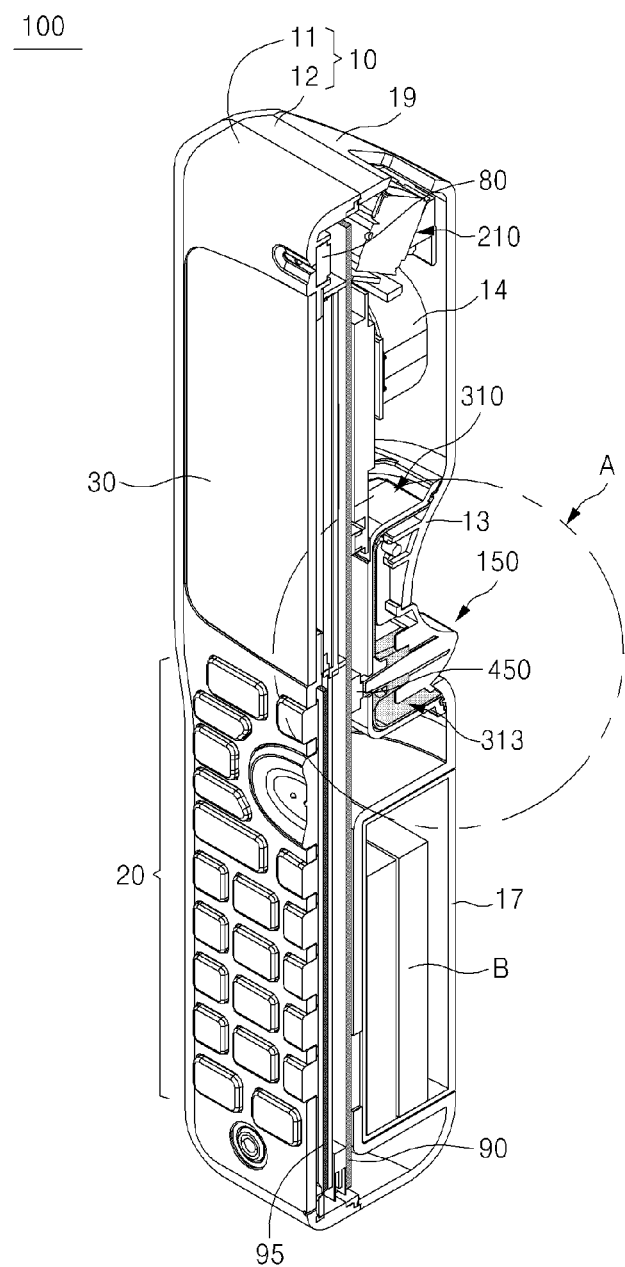
FIG. 5 is a cut-open perspective view of the mobile terminal of FIG. 1.
Figure 6:
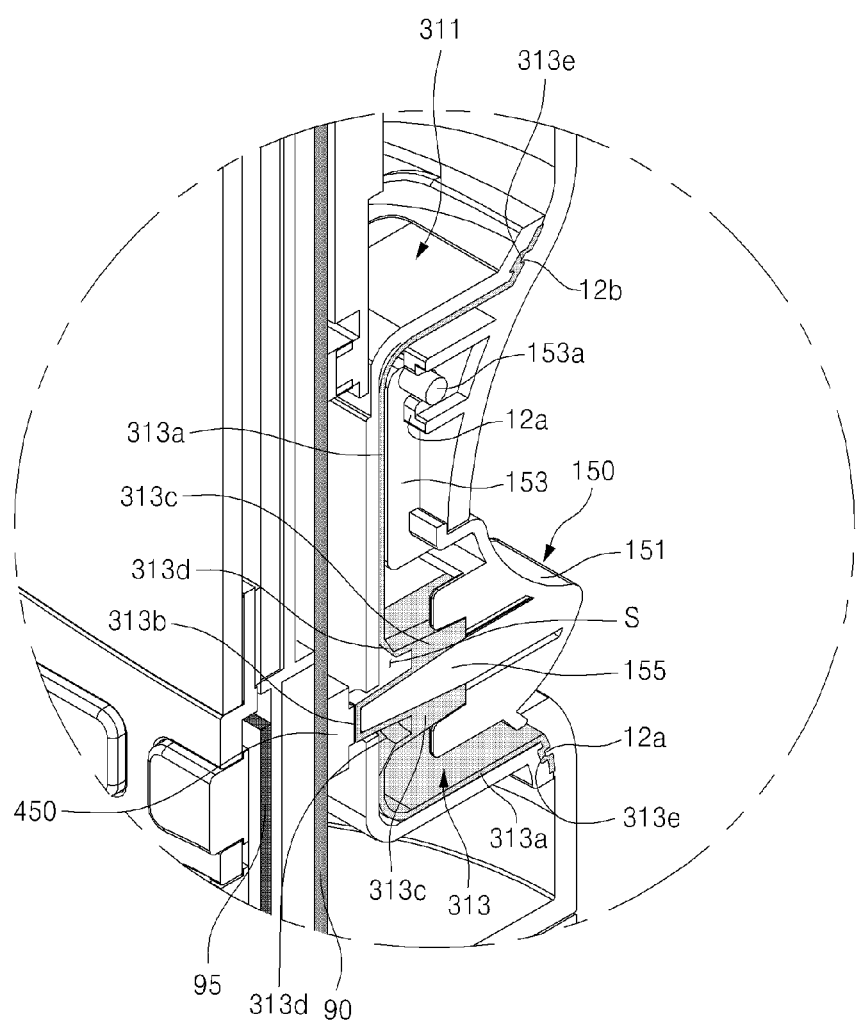
FIG. 6 is an enlarged view of an 'A' region in FIG. 5.

FIG. 1 is a front perspective view of a mobile terminal according to an exemplary embodiment of the present inventive concept, FIG. 2 is a rear perspective view of the mobile terminal of FIG. 1, FIG. 3 is a front exploded perspective view of the mobile terminal of FIG. 1, FIG. 4 is a rear exploded perspective view of the mobile terminal of FIG. 1, FIG. 5 is a cut-open perspective view of the mobile terminal of FIG. 1, and FIG. 6 is an enlarged view of an 'A' region in FIG. 5.

Referring to FIGS. 1 to 6, the mobile terminal 100 in this exemplary embodiment includes a terminal casing 10 having a front casing 11 and a rear casing 12 coupled to each other, an information recognition module 210 coupled to the terminal casing 10, a main printed circuit board (PCB) 90 provided inside the terminal casing 10 and mounted with various internal components including the information recognition module 210, a keypad unit 20 provided in one area of the front casing 11, a display unit 30 provided in another area of the front case 11, an information recognition module drive unit 310 for driving the information recognition module 210 as a trigger 150 exposed outside of the rear casing 12 is pulled, and an information recognition speaker 60 for generating a signaling sound when the information recognition module 210 operates.

In this exemplary embodiment, the information recognition module 210 is a barcode reader module 210 provided inside and coupled to the terminal casing 10, and the information recognition module drive unit 310 is a barcode reader module drive unit 310, but not limited thereto. Alternatively, the information recognition module may be various information recognition modules. For example, the information recognition module of the second exemplary embodiment of the present inventive concept is achieved by an RFID reader module.

Also, the mobile terminal 100 in this exemplary embodiment is an industrial PDA, but not limited thereto. Alternatively, the mobile terminal 100 may be applied to a mobile communication terminal including a cellular phone as well as a general PDA.

Referring to FIGS. 1 to 6, the terminal casing 10 forms an outer appearance of the mobile terminal 100, and at the same time provides a space where a plurality of internal components are accommodated. The terminal casing 10 includes the front casing 11 and the rear casing 12 that can be disassembled and assembled for the mounting and maintenance of various internal components. The front casing 11 forms a front side of the terminal casing 10, and the rear casing 12 forms a rear side of the terminal casing 10. At this time, the front casing 11 and the rear casing 12 are coupled by bolts for easy disassembling and assembling. In the meantime, a battery casing 17 is detachably coupled to a lower end part of the rear casing 12 so that a battery B can be received therein.

Referring to FIGS. 3 to 5, the barcode reader module 210 is mounted on the main PCB 90 inside the terminal casing 10. Specifically, the barcode reader module 210 is arranged to an upper region in a space limited by the rear casing 12 and the main PCB 90, and mounted to a rear side of the main PCB 90 by a module bracket 211, thereby electrically connecting with the main PCB 90. The barcode reader module 210 may be one selected from commercialized products. The barcode reader module 210 emits light to a barcode to be recognized through a window 15 provided in the rear casing 12, and reads information from the barcode on the basis of an electronic signal generated in accordance of intensity of reflected light. Thus, the window 15 is made of a transparent material through which light emitted from the barcode reader module 210 and light reflected by a medium printed with the barcode can pass.

Meanwhile, a position where the barcode reader module 210 is mounted may be varied depending on positions of the window 15. For example, the window 15 may be positioned where it is convenient for a user to put the mobile terminal 100 to the barcode printed on the goods or the like while grasping the mobile terminal 100 in his/her hand. In this exemplary embodiment, the window 15 is placed in an upper part of the rear casing 12 in consideration of a bar-type mobile terminal 100, and a part 19 of the rear casing 12 adjacent to the window 15 is shaped like an inclined plane as shown in FIGS. 2 and 5, so that it can be stably put to the barcode printed on the goods or the like. However, the positions of mounting the barcode reader module 210 and forming the window 15 are not limited to the present exemplary embodiment, and may be selected properly.

Referring to FIGS. 4 to 6, the main PCB 90 is placed in the middle between the front casing 11 and the rear casing 12 inside the terminal casing 10. The main PCB 90 provides a part where various internal components including the barcode reader module 210 are mounted as described above. For example, as shown in FIG. 4, the main PCB 90 may be mounted with a wireless communication module 70 for wirelessly transmitting and receiving audio and video data, etc., a camera module (not shown) for taking a picture, a memory card 91 as a storage medium, a universal subscriber identity module (USIM) card 93 for identifying a user of a wideband code division multiple access (WCDMA) phone, etc.

The internal components mounted to the main PCB 90 are electrically connected through the controller (not shown) and the main PCB 90. The controller is in charge of general control for the mobile terminal 100, such as control of the keypad unit 20 and the display unit 30 as well as the internal components mounted to the main PCB 90. Such a controller may be a microprocessor, a microcontroller, etc. or may be achieved in the form of software or firmware.

Referring to FIGS. 1, 3, 5 and 6, the keypad unit 20 is provided in a lower region of the front casing 11. The keypad unit 20 is an input device for inputting various information, control commands, etc. to the mobile terminal 100, which includes a plurality of letter/numeral keys 21, a plurality of function keys 22, a navigation key 23, etc. Various keys 21, 22 and 23 of the keypad unit 20 are configured by a press input type (i.e., a button input type). To this end, a keypad PCB 95 is provided in a position adjacent to the keypad unit 20 in between the front casing 11 and the main PCB 90, and mounted with dome switches for generating an electrical signal as various keys 21, 22 and 23 of the keypad unit 20 are pressed. The keypad PCB 95 is electrically connected to the main PCB 90 by a flexible cable, a flexible printed circuit board, etc. However, the navigation key 23 may be configured by the touch input type that has recently been widely employed in various terminal products, in which the 'touch input type' involves a 'touch pad type' employed in a notebook computer or the like; a 'touch wheel type' that becomes famous since it is employed in Apple's iPod; etc., and refers to a type of selecting a menu or the like with a user's light finger touch.

Referring to FIGS. 1, 3 and 5, the display unit 30 is provided adjacent to the keypad unit 20 in an upper region of the front casing 11. The display unit 30 is a flat panel display device for displaying visual information including various images, which includes a liquid crystal display (LCD), a plasma display panel (PDP), an organic light emitting diodes (OLED), etc. The display unit 30 is electrically connected to the main PCB 90.

Meanwhile, a display side of the display unit 30 may be further provided with a touch panel as an input device for receiving various information, control commands, etc. on the display side of the display unit 30. In the case of providing the touch panel on the display side of the display unit 30, the foregoing keypad unit 20 may be remained or omitted. Although it is not shown, in the case that the touch panel is provided as the display unit 30, the terminal casing 10 may have a mounting part to which a separate touch pen is mounted.

Referring to FIGS. 3 to 6, the barcode reader module drive unit 310 has a gun-type drive structure which includes a trigger 150 exposed outside of the rear casing 12, an operation switch 450 for generating an electrical signal for operating the barcode reader module 210 as the trigger 150 is pulled, a trigger cover 311 coupled to the rear casing 12 so as to cover the trigger 150 inside the terminal casing 10, and a soft sealing member 313 interposed between the trigger cover 311 and the trigger 150.

As shown in FIGS. 3 to 6, the trigger 150 includes a pulling unit 151 exposed to the outside of the terminal casing 10 through the rear casing 12 so as to be pulled by a user's finger, a rotary unit 153 rotatably coupled to the rear casing 12, and a switch pressing unit 155 protruding from the pulling unit 151 so as to press the operation switch 450. The trigger 150 is generally made of a synthetic resin, but not limited thereto.

The pulling unit 151 is exposed to the outside of the terminal casing 10 through an opening 16 pierced on the rear casing 12, and pulled by a user's index finger or the like when s/he wants to operate the barcode reader module 210 while grasping the mobile terminal 100 in his/her hand. At this time, a part 13 of the rear casing 12 adjacent to the opening 16 for exposing the pulling unit 151 is recessed as shown in FIGS. 2 and 4 so that convenience in operating the trigger 150 can be improved.

The rotary unit 153 is extended upward from the pulling unit 151 and formed with a rotary shaft 153a at the end thereof. At this time, the rotary shaft 153a is hooked to a trigger coupling hole 12a formed on an inner side of the rear casing 12, and serves as a rotary center for the trigger 150 when the trigger 150 is pulled by a user's finger.

The switch pressing unit 155 is extended from the pulling unit 151 toward the main PCB 90, and shaped like a bar protruding to press the operation switch 450 via a through hole 311a formed on the trigger cover 311. The switch pressing unit 155 contacts and presses the operation switch 450 via the sealing member 313 as the trigger 150 is pulled.

The operation switch 450, as shown in FIGS. 4 and 5, is mounted to the rear side of the main PCB 90 at a position corresponding to the switch pressing unit 155 of the trigger 150. If a user pulls the trigger 150 with his/her finger and the switch pressing unit 15 of the trigger 150 presses the operation switch 450, the operation switch 450 generates an electrical signal for operating the barcode reader module 210. The generated electrical signal is transmitted to the controller (not shown) through the main PCB 90, and thus the controller initiates the operation of the barcode reader module 210 in order to read the barcode printed on the goods or the like.

In this exemplary embodiment, the operation switch 450 is provided in the form of a tact switch. If the switch pressing unit 155 contacts and presses the tact switch 450 via the sealing member 313 as the trigger 150 is pulled, the tact switch 450 is pressed or released.

As shown in FIGS. 3 and 4, the trigger cover 311 is coupled to the inner side of the rear case 12 by a bolt 311c so as to cover the trigger 150 from the inside of the terminal casing 10. The trigger cover 311 is generally shaped like a rectangular box opened at one side except a bolt fastening part 311b to which the bolt 311c is fastened. The trigger cover 311 is formed with the through hole 311a at a position corresponding to the operation switch 450 so that the switch pressing unit 155 of the trigger 150 can pass therethrough. The trigger cover 311 is generally made of a synthetic resin, but not limited thereto. The trigger cover 311 serves as a housing or frame for accommodating and supporting the sealing member 313 to be described later.

As shown in FIGS. 3 to 6, the sealing member 313 is a soft member arranged between the trigger cover 311 and the trigger 150, and basically has a shape for covering the inner side of the trigger cover 311. The sealing member 313 is spaced apart from the inner side of the trigger cover 311 and shaped to surround the switch pressing unit 155 at a position corresponding to the switch pressing unit 155 of the trigger 150 so that the trigger 150 can be elastically biased in a direction opposed to a direction of pulling the trigger 150 when the trigger 150 is pulled. That is, the sealing member 313 has a shape to give an elastic bias to the trigger 150 as being accommodated in the trigger cover 311 and supported by the inner side of the trigger cover 311. In this exemplary embodiment, the sealing member 313 is made of silicon rubber, but not limited thereto.

As shown in FIG. 6, the sealing member 313 includes a first part 313a covering the inner side of the trigger cover 311, a second part 313b surrounding an end part of the switch pressing unit 144 of the trigger 150, a third part 313c recessed toward the rear casing 12 along the circumference of the second part 313b, and a fourth part 313d bent from the first part 313a and extended toward the third part 313c. The sealing member 313 is made of a soft material, so that a recessed space S defined by the second part 313b, the third part 313c and the fourth part 313d can be transformed to be compressed when the trigger 150 is pulled. Further, the transformed sealing member 313 returns to its original shape when the trigger 150 is released from the pulling. With this operation, the sealing member 313 gives the elastic bias to the trigger 150. That is, the transforming and returning operation of the sealing member 313 elastically biases the trigger 150 in the opposed direction to the direction of pulling the trigger 150 when the trigger 150 is pulled.

Meanwhile, the third part 313c is thicker than other parts 313a, 313b and 313d in order to provide a stable and enough elastic bias to the trigger 150. Also, the sealing member 313 includes a groove line 313e, in which a projection line 12b formed on the inner side of the rear casing 12 is inserted, in a part being in close contact with the inner side of the rear casing 12 to improve a sealing effect. The groove line 313e is formed along an edge of the sealing member 313 as being recessed from the surface of the sealing member 313.

With this configuration, the sealing member 313 seals up the circumference of the trigger 150 inside the terminal casing 10 in order to prevent water from penetration to the main PCB 90 through a gap between the opening 16 pierced on the rear casing 12 and the trigger 150, and elastically biases the trigger 150 in the opposed direction to the direction of pulling the trigger 150 when the trigger 150 is pulled, in order to improve click or operation feeling. Further, the sealing member 313 surrounds the end part of the switch pressing unit 155 so as not to make the switch pressing unit 155 of the trigger 150 for pressing the operating switch 450 be in direct contact with the operation switch 450, thereby protecting the operation switch 450.

Referring to FIG. 4, the information recognition speaker 60 is mounted to the rear side of the main PCB 90 inside the terminal casing 10. The information recognition speaker 60 is provided separately from a telephone speaker 80 (see FIG. 5) that generates sound for a telephone call, and has higher output than the telephone speaker 80. The information recognition speaker 60 generates the signaling sound for informing a user of whether a reading operation succeeds when reading the barcode printed on the goods or the like by the barcode reader module 210. At this time, the signaling sound generated at succeed in the reading operation and the signaling sound generated at fail in the reading operation may be set up to be different from each other, or the signaling sound may be generated only at the succeed in the reading operation.

Meanwhile, the rear casing 12 includes a guide partition wall 14 surrounding the circumference of the information recognition speaker 60 on the inner side thereof as shown in FIGS. 3 and 4 so that the signaling sound generated by the information recognition speaker 60 can be effectively propagated to the outside, and a plurality of speaker holes 18 at a position corresponding to the information recognition speaker 60.

Figure 7:
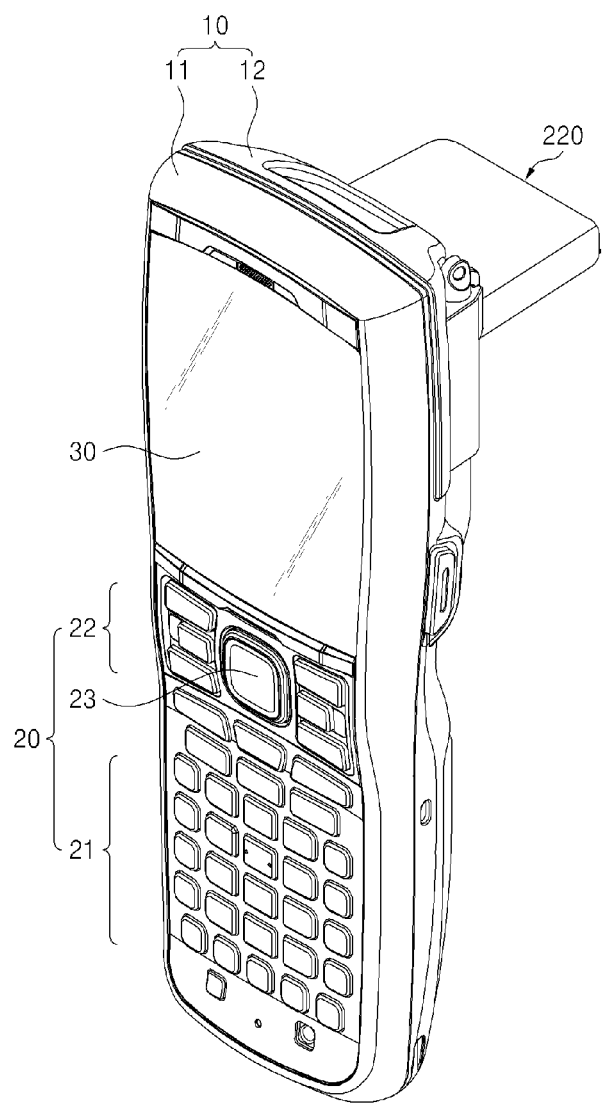
FIG. 7 is a perspective view of a mobile terminal according to a second exemplary embodiment of the present inventive concept.
Figure 8:
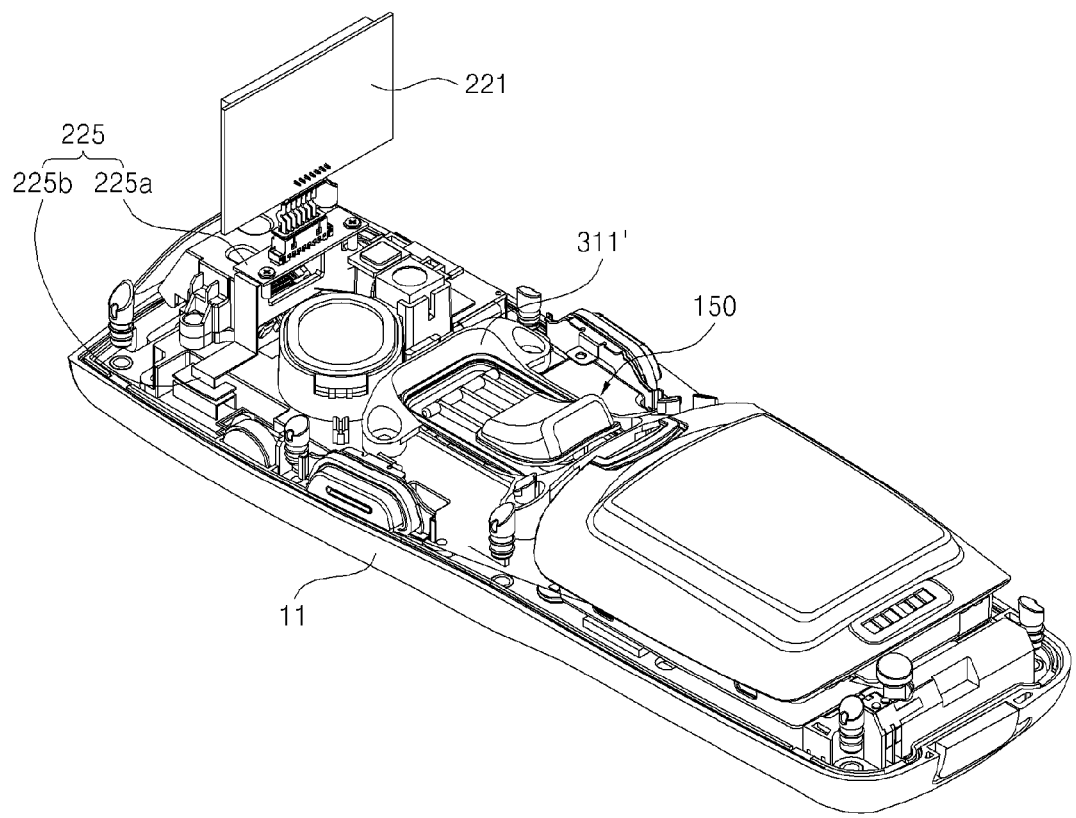
FIG. 8 is a rear perspective view of the mobile terminal of FIG. 7.
Figure 9:
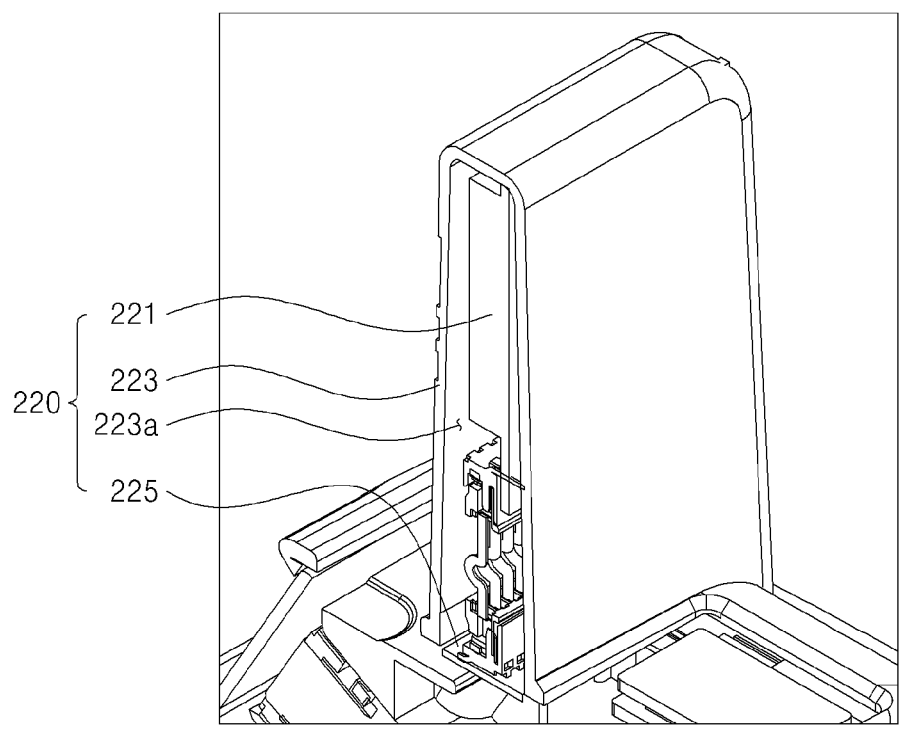
FIG. 9 is an enlarged cut-open view showing an RFID reader module of the mobile terminal of FIG. 7.
Figure 10:
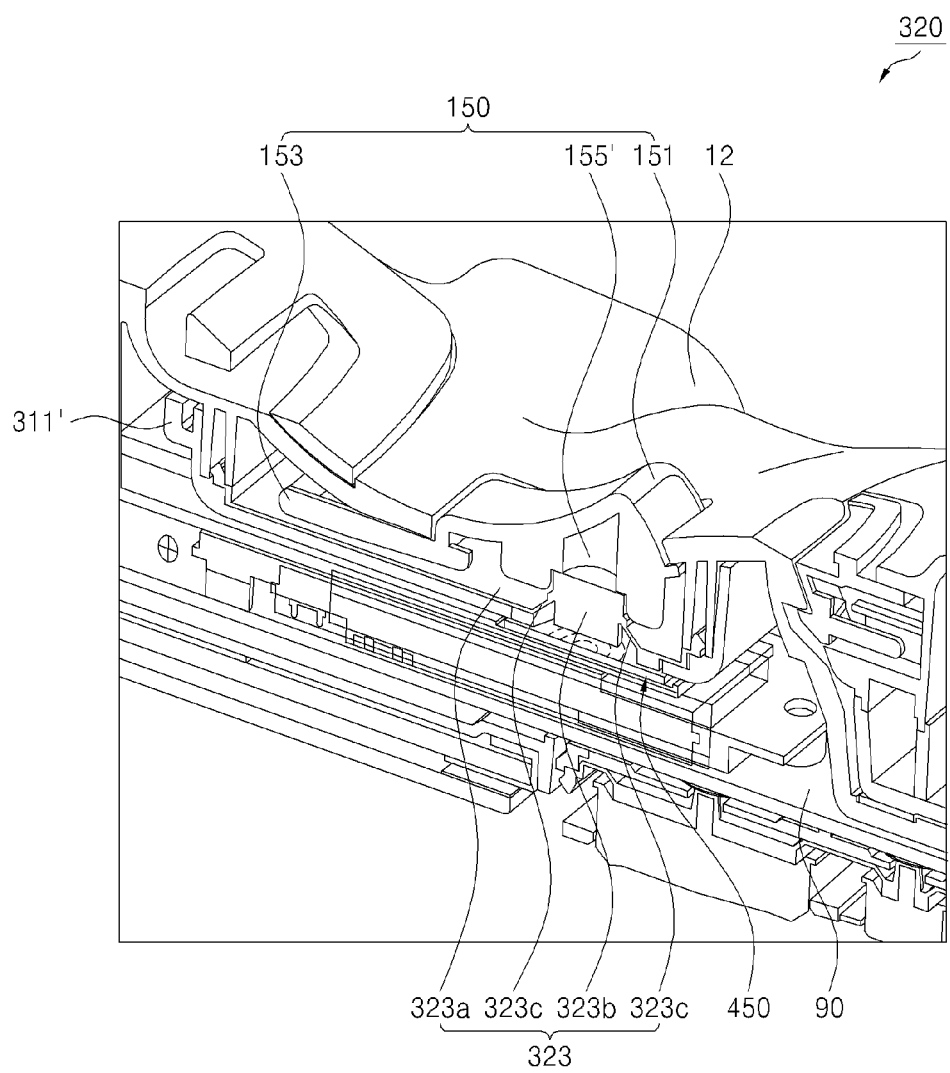
FIG. 10 is an enlarged cut-open view showing an RFID reader module drive unit of the mobile terminal of FIG. 7.
Figure 11:
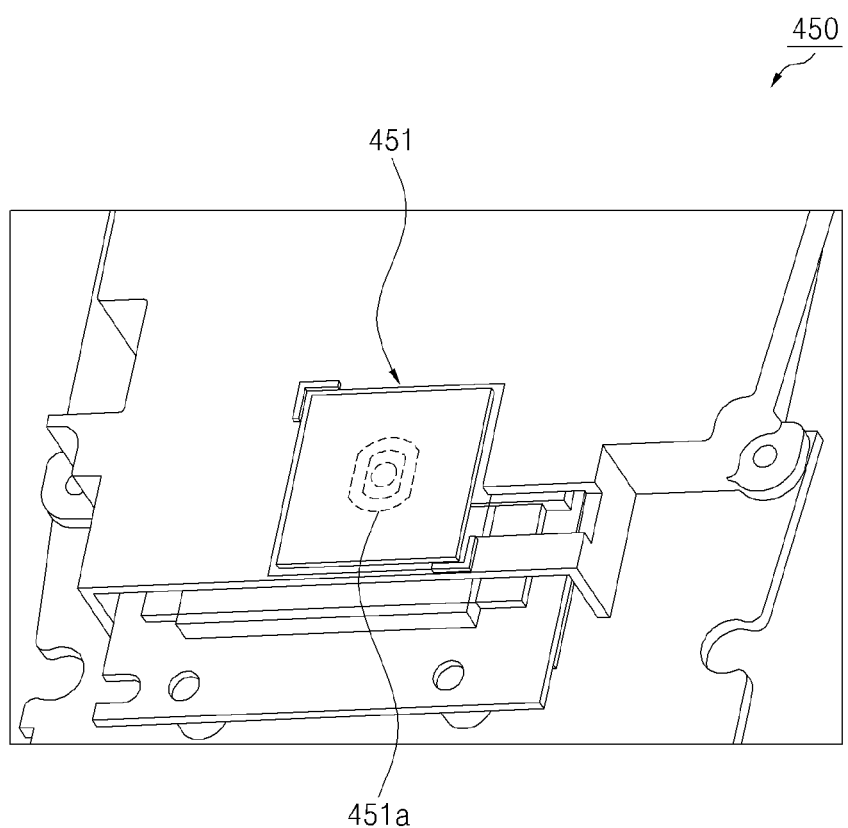
FIG. 11 is an enlarged view of an operation switch of the mobile terminal of FIG. 7.

FIG. 7 is a perspective view of a mobile terminal according to a second exemplary embodiment of the present inventive concept, FIG. 8 is a rear perspective view of the mobile terminal of FIG. 7, FIG. 9 is an enlarged cut-open view showing an RFID reader module of the mobile terminal of FIG. 7, FIG. 10 is an enlarged cut-open view showing an RFID reader module drive unit of the mobile terminal of FIG. 7, and FIG. 11 is an enlarged view of an operation switch of the mobile terminal of FIG. 7.

Hereinafter, a mobile terminal having an RFID reader module according to the second exemplary embodiment will be described, in which the information recognition module 220 is an RFID reader module 220 coupled to the terminal casing, and the information recognition module drive unit 320 is an RFID reader module drive unit 320. This exemplary embodiment is partially different from the first exemplary embodiment, and therefore only different elements from those of the first exemplary embodiment will be described without repetitive descriptions.

Referring to FIGS. 7 to 11, the RFID reader module 220 includes an RFID reader antenna 221 to receive information about products from an RFID tag (not shown) attached to the products or the like, an RFID casing 223 coupled to the terminal casing and coupling with the RFID reader antenna 221, and a bridge PCB 225 arranged between the RFID reader antenna 221 and the main PCB 90 and electrically connecting the RFID reader antenna 221 and the main PCB 90.

The RFID casing 223 is separately provided and coupled to the terminal casing 10, but not limited thereto. Alternatively, the RFID casing 223 and the terminal casing 10 may be formed as a single body.

In this exemplary embodiment, the RFID casing 223 is coupled to the rear casing 12 and protrudes outward from the rear casing 12. Further, the RFID casing 223 internally includes an accommodating space 223a in which the RFID reader antenna 221 can be accommodated. Thus, the RFID reader antenna 221 is accommodated in the accommodating space 223a of the RFID casing 223, so that the RFID reader antenna 221 can be prevented from being broken or damaged due to external impact.

The RFID reader antenna 221 serves as a receiving antenna for receiving information transmitted from a transmitting antenna of the RFID tag attached to the product or the like.

The RFID reader antenna 221 has to be electrically connected to the main PCB 90 provided in the terminal casing 10. To this end, the foregoing bridge PCB 225 is provided for electrically connecting the RFID reader antenna 221 and the main PCB 90.

The bridge PCB 225 includes a coupling surface 225a to which the RFID reader antenna 221 is coupled, and a connector surface 225b to which the main PCB 90 is coupled. The bridge PCB 225 is made of a conductive material since it serves to electrically connect the RFID reader antenna 221 and the main PCB 90.

Meanwhile, the RFID reader module drive unit 320 for operating the RFID reader module 220 has the same gun type driving structure as that of the first exemplary embodiment, and broadly includes the trigger 150 exposed outside of the rear casing 12, and the operation switch 450 generating an electrical signal for operating the RFID reader module 220 as the trigger 150 is pulled.

Like the first exemplary embodiment, the RFID reader module drive unit 320 also includes a trigger cover 311' for covering the trigger 150, and the sealing member 323 made of soft materials interposed between the trigger cover 311' and the trigger 150.

Inside the terminal casing 10, the trigger 150 is covered with the trigger cover 311' coupled to the rear casing 12.

The trigger 150 includes the pulling unit 151, the rotary unit 153 and the switch pressing unit 155', in which the pulling unit 151 and the rotary unit 153 serves as corresponding elements similar to the pulling unit 151 and the rotary unit 153 of the first exemplary embodiment, and the switch pressing unit 155' contacts and is coupled to the sealing member 323 interposed between the trigger cover 311' and the trigger 150.

The sealing member 323 interposed between the trigger 150 and the trigger cover 311' includes a main body part 323a covering the inner side of the trigger cover 311', a contact part 323b being in contact with and pressed by the operation switch 450 as the trigger 150 is pulled by a user, and an inclined part 323c connecting the main body part 323a and the contact part 323b so that the contact part 323b can be elastically biased in a direction opposed to a pressing direction when the contact part 323b is pressed toward the operation switch 450.

The main body part 323a is provided as an element corresponding to the first part 313a of the first exemplary embodiment, and serves to cover the inner side of the trigger cover 311'. Meanwhile, the contact part 323b is a part for substantially contacting the operation switch 450 when the trigger 150 is pulled. The contact part 323b couples with a contact switch (not shown) of the operation switch 450 to be described later, and the foregoing switch pressing unit 155' of the trigger 150 on an opposed side to the side coupling with the contact switch.

The inclined part 323c is provided to elastically bias the contact part 323b as described above. Specifically, when the contact part 323b contacts a trigger PCB 451 of the operation switch 450 as the trigger 150 is pulled, the inclined part 323c returns the switch pressing unit 155' of the trigger 150 coupling with the contact part 323b to an original position before the trigger 150 is pulled.

Meanwhile, the operation switch 450 generating the electrical signal is provided as a dome switch unlike that the operation switch 450 of the first exemplary embodiment is provided as the tact switch.

The operation switch 450, i.e., the dome switch 450 in this exemplary embodiment includes the contact switch (not shown) and the trigger PCB 451 as described above. The contact switch (not shown) is coupled to the contact part 323b, and more particularly coupled to a lower side of the contact part 323b, i.e., to a side where the contact part 323b of the sealing member 323 directly contacts the trigger PCB 451.

The trigger PCB 451 to be in contact with the contact switch (not shown) at a point is formed with a point contact circuit 451a capable of generating an electrical signal when contacts the contact switch (not shown) at a point.

Hereinafter, the procedures of operating the RFID reader module 220 by the RFID reader module drive unit 320 will be described in brief.

If the pulling unit 151 of the trigger 150 is pulled by a user's finger, the contact part 323b of the sealing member 323 coupled to the switch pressing unit 155' is pressed toward the trigger PCB 451 of the operation switch 450. The contact part 323b is coupled with the contact switch (not shown) contacting the point contact circuit 451a formed in the trigger PCB 451 and generating the electrical signal, so that the electrical signal for operating the RFID reader module 220 can be generated while the contact switch (not shown) contacts the point contact circuit 451a at a point.

Thus, the RFID reader module 220 operates so that the RFID reader antenna 221 can receive information about the produce from the RFID tag (not shown) attached to the product.

In this exemplary embodiment, the information recognition module provided in the mobile terminal is the RFID reader module 220, but not limited thereto. Alternatively, the information recognition module may include both the barcode reader module 210 and the RFID reader module 220.

Like this, if the mobile terminal includes both the barcode reader module 210 and the RFID reader module 220, one of the barcode reader module 210 and the RFID reader module 220 may be operated by the trigger 150 and the other one may be operated by key control on the keypad unit 20. Also, the module to be operated by the trigger 150 between the barcode reader module 210 and the RFID reader module 220 may be selectively changed by key control on the keypad unit 20.

As described above, the mobile terminal 100 in this exemplary embodiment operates the information recognition module 210, 220 by pulling the trigger 150 exposed outside of the rear casing 12. Thus, the information recognition module 210, 220 can be operated as the trigger is pulled with an index finger or the like in the state that a user more stably grasps the mobile terminal in his/her hand, thereby improving convenience and stability in operating the information recognition module 210, 220 provided in the mobile terminal 100.

Also, the mobile terminal according to the present exemplary embodiments is configured in such a manner that the sealing member 313, 323 having the foregoing configuration is placed in between the trigger cover 311, 311' and the trigger 150. Therefore, water is prevented from penetration to the main PCB 90 through a gap between the opening 16 pierced on the rear casing 12 and the trigger 150. Further, the trigger 150 is elastically biased in the opposed direction to the direction of pulling the trigger 150 when the trigger 150 is pulled, thereby improving click or operation feeling.

While this invention has been particularly shown and described with reference to preferred embodiments thereof, it will be understood by those skilled in the art that various changes in form and details may be made therein without departing from the spirit and scope of the invention as defined by the appended claims.

INDUSTRIAL APPLICABILITY

The present inventive concept can be applied to an industrial mobile terminal

The invention claimed is:

1. A mobile terminal comprising:
a terminal casing comprising a front casing and a rear casing coupled to each other;
an information recognition module coupled to the terminal casing; and
an information recognition module drive unit comprising:
a trigger provided in the terminal casing and exposed outside of the terminal casing through an opening on the rear casing;
an operation switch to generate an electrical signal for operating the information recognition module as the trigger is pulled; and
a sealing member configured to prevent the trigger from being in direct contact with the operation switch, push the operation switch by being pushed by the trigger as the trigger is pulled, and prevent water coming into the terminal casing through the opening from reaching the operation switch.

2. The mobile terminal of claim 1, wherein the information recognition module comprises a barcode reader module coupled to the terminal casing, and the information recognition module drive unit comprises a barcode reader module drive unit.

3. The mobile terminal of claim 2, wherein the barcode reader module drive unit comprises a trigger cover coupled to the rear casing to cover the trigger within the terminal casing, and the sealing member is made of a soft material and placed between the trigger cover and the trigger.

4. The mobile terminal of claim 2, wherein the trigger comprises:
a pulling unit exposed to the outside through the opening so as to be pulled by a user's finger;
a rotary unit rotatably coupled to the rear casing; and
a switch pressing unit protruding from the pulling unit so as to press the operation switch by pushing the sealing member.

5. The mobile terminal of claim 3, wherein the sealing member is accommodated in and supported by the trigger cover so that the trigger can be elastically biased in a direction opposed to a direction of pulling the trigger when the trigger is pulled.

6. The mobile terminal of claim 4, wherein the sealing member is shaped to cover an inner side of the trigger cover and surround the switch pressing unit as being spaced apart from the inner side of the trigger cover at a position corresponding to the switch pressing unit so that the trigger can be elastically biased in a direction opposed to a direction of pulling the trigger when the trigger is pulled.

7. The mobile terminal of claim 6, wherein the sealing member comprises:
a first part covering the inner side of the trigger cover;
a second part surrounding an end part of the switch pressing unit of the trigger;
a third part recessed along a circumference of the second part; and
a fourth part bent from the first part and extended toward the third part.

8. The mobile terminal of claim 7, wherein the third part is thicker than the other parts.

9. The mobile terminal of claim 7, wherein the sealing member comprises a groove line in which a projection line formed on an inner side of the rear casing is inserted, in a part being in close contact with the inner side of the rear casing.

10. The mobile terminal of claim 3, wherein the sealing member comprises:
a main body part covering an inner side of the trigger cover;
a contact part being in contact with and pressed by the operation switch as the trigger is pulled; and
an inclined part connecting the main body part and the contact part so that the contact part can be elastically biased in a direction opposed to a direction of pressing the contact part when the contact part is pressed.

11. The mobile terminal of claim 10, wherein the trigger comprises:
a pulling unit exposed to the outside through the opening so as to be pulled by a user's finger;

a rotary unit rotatably coupled to the rear casing; and a switch pressing unit being in contact with and coupled with the contact part of the sealing member.

12. The mobile terminal of claim 11, wherein the operation switch comprises:

a contact switch coupled to a lower side of the contact part; and a trigger printed circuit board (PCB) formed with a point contact circuit with which the contact switch becomes in contact when the trigger is pulled.

13. The mobile terminal of claim 1, wherein a part of the rear casing adjacent to the opening is recessed.

14. The mobile terminal of claim 1, further comprising an information recognition speaker which is provided inside the terminal casing and generates a signaling sound when the information recognition module operates, wherein the rear casing comprises a guide partition wall surrounding a circumference of the information recognition speaker on the inner side thereof.

15. The mobile terminal of claim 2, further comprising a window placed in an upper part of the rear casing and transmitting light emitted from the barcode reader module, wherein a part of the rear casing adjacent to the window is shaped like an inclined plane.

16. The mobile terminal of claim 2, further comprising a main printed circuit board (PCB) provided inside the terminal casing, wherein the barcode reader module and the operation switch are mounted to the main PCB.

17. The mobile terminal of claim 3, wherein the sealing member comprises silicon rubber, the trigger cover comprises a synthetic resin, and the operation switch comprises a tact switch.

18. The mobile terminal of claim 1, further comprising:

a keypad unit provided in one area of the front casing; and a display unit provided adjacent to the keypad unit on the front casing.

19. The mobile terminal of claim 18, wherein the keypad unit comprises:

a plurality of letter and numeral keys;

a plurality of function keys; and a navigation key.

20. The mobile terminal of claim 18, wherein the display unit comprises a touch panel.

21. The mobile terminal of claim 1, wherein the information recognition module comprises a radio frequency identification (RFID) reader module coupled to the terminal casing, and the information recognition module drive unit comprises an RFID reader module drive unit.

22. The mobile terminal of claim 21, further comprising a main printed circuit board (PCB) provided inside the terminal casing, wherein the RFID reader module comprises:

an RFID reader antenna to receive external information from an RFID tag;

an RFID casing coupled to the terminal casing and coupling with the RFID reader antenna; and a bridge PCB arranged between the RFID reader antenna and the main PCB and electrically connecting the RFID reader antenna and the main PCB.

23. The mobile terminal of claim 1, wherein the information recognition module comprises:

a barcode reader module coupled to the terminal casing; and an RFID reader module coupled to the terminal casing.

* * * * *